United States Patent
Tang et al.

(10) Patent No.: US 6,373,824 B1
(45) Date of Patent: Apr. 16, 2002

(54) NETWORK TRAFFIC SPECIFICATION

(75) Inventors: Puqi Tang, Portland, OR (US); Yitang Zhang, Durham, NH (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/751,833

(22) Filed: Dec. 29, 2000

(51) Int. Cl.⁷ .................................................. H04J 1/16
(52) U.S. Cl. ........................................ 370/252; 370/235
(58) Field of Search .................................. 370/252, 235, 370/236, 237, 253, 412, 413, 414, 415, 234

(56) References Cited

U.S. PATENT DOCUMENTS 5,274,625 A * 12/1993 Derby et al.
5,408,465 A * 4/1995 Gusella et al.
6,205,149 B1 * 3/2001 Lemaire et al.

* cited by examiner

*Primary Examiner*—William Luther
(74) *Attorney, Agent, or Firm*—Fish & Richardson P.C.

(57) ABSTRACT

A method and system are disclosed for measuring data traffic with parameters of the token bucket (with queue) traffic shaping model. Based upon measurements of data traffic, token bucket capacity is calculated as a function of token generation. The complexity of the calculations is linearly related to the number of data packets in the traffic pattern.

21 Claims, 3 Drawing Sheets

NETWORK TRAFFIC SPECIFICATION

BACKGROUND

The flow of information in a network is often called "traffic," while units of information used in network communication are called "packets." Packets generally arrive at various points in the network at random intervals, resulting in "bursts" of traffic that may result in congestion. When congestion occurs, the network's ability to deliver the packets to their destinations is taxed, sometimes causing one or more packets to be lost or delayed. To relieve congestion, various traffic shaping techniques have been developed. One traffic shaping technique, for example, enforces an average traffic flow rate that smoothes out bursts. Another more widely-used traffic shaping technique, called "the token bucket model," accommodates some bursts of traffic for short periods of time.

Measurements of the average rate of traffic flow and the "burstiness" of the traffic are useful in these contexts. Measurements of rate and burstiness can be computed by computer according to a variety of algorithms. Many conventional algorithms are of complexity O(n log n), in which n is the number of packets in the traffic pattern, meaning that execution time is proportional to the number of packets times the log of the number of packets.

DETAILED DESCRIPTION

The techniques described below for measuring and shaping traffic are of less complexity than conventional techniques, often approaching a complexity of O(n), meaning that computation time is a linear function of the number of packets in the traffic pattern. For example, the processes and systems described below facilitate the measurement and specification of network traffic to determine whether the traffic conforms to a particular communication technique, such as the token bucket communication model.

Figure 1:
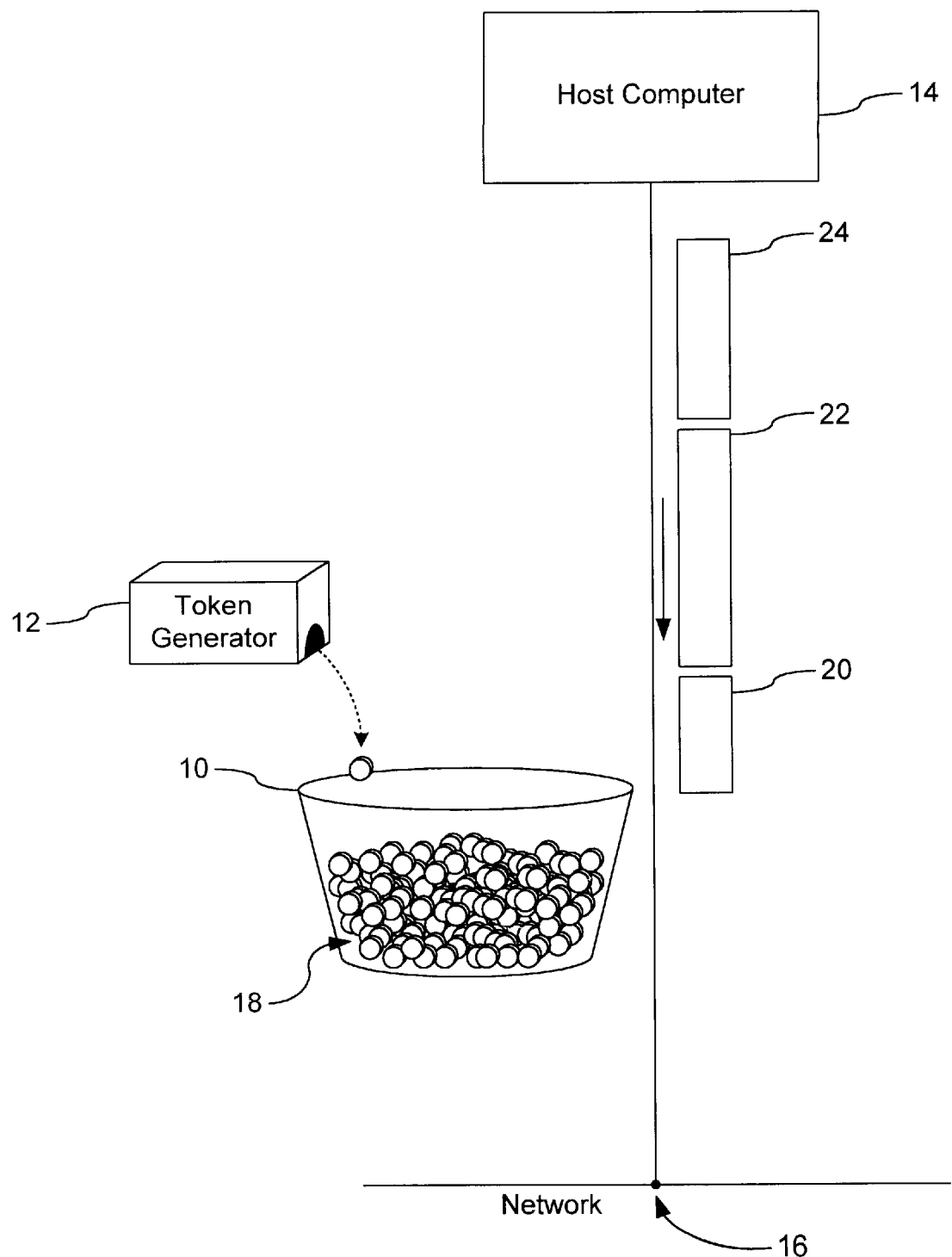
FIG. 1 illustrates the token bucket traffic shaping technique.

To aid in explanation of the inventive processes for measuring and charactering network traffic, the widely-used token bucket traffic shaping communication model is first explained in further detail. FIG. 1 illustrates the model in the context of a host computer 14 providing data packets 20, 22 and 24 for delivery on network 16. Data packets 20, 22 and 24 are processed through a flow controller using a token bucket scheduling counter 10. Data packets 20, 22 and 24 are shown in FIG. 1 as being of different sizes, i.e., each packet consists of a different number of bytes.

The token bucket model regulates data flow. Unlike other traffic specification models, the token bucket model does not enforce a rigid average data flow rate. Rather, the token bucket model allows large bursts of data to flow, but regulates how large the bursts can be. Data flow is regulated by tokens 18, which are periodically generated by token generator 12 and are saved in token bucket 10. In many implementations of the token bucket model, each token 18 allows one byte to be released to the network. For each byte that passes onto the network, one token is used up and is removed from token bucket 10. A "token generation rate" (r) represents a number of tokens generated per unit of time. Token bucket 10 accumulates tokens 18 at a rate r, but there is a maximum number of tokens 18 that token bucket 10 can hold, or a "token bucket capacity" (b).

In the example illustrated in FIG. 1, several tokens 18 have accumulated in token bucket 10 when first data packet 20 arrives. For purposes of illustration, assume there are two million tokens 18 in token bucket 10, and the size of first data packet 20 is 500 kilobytes. First data packet passes onto network 16 right away, using up 500,000 tokens in the process. After first data packet 20 is transmitted, 1.5 million tokens remain in token bucket 10. If the size of second data packet 22 is 1.8 megabytes, for example, there are not enough tokens in token bucket 10 to transmit second data packet 22. Data packets are generally treated as non-divisible entities, i.e., a packet is not broken into pieces for transmission. Accordingly, second data packet 22 may be temporarily stored on a queue, waiting for token generator 12 to generate 300,000 more tokens (assuming a queue exists and second data packet 22 is not simply discarded). After token generator 12 has generated 300,000 more tokens, second data packet 22 is transmitted, using up all tokens in the bucket and leaving none. Third data packet 24 waits in the queue for token generator 12 to generate enough tokens to allow third data packet 24 to be transmitted.

In one implementation of the token bucket technique, token generator 12 is a counter, which increments at constant rate r and which cannot count higher than b. The counter decrements for each packet transmitted by the number of bytes in the packet. The model allows data bursts of a large number of bytes per second, but the data bursts cannot exceed bytes. The burstiness of the traffic is therefore limited by b. The rate at which the traffic flows without burstiness is r.

On network side 16, traffic pattern data associated with the data transmission can be measured, and values of r and b that describe the traffic can be calculated based upon the measurements. If token bucket 10 lacks a queue, the calculations are simpler than if a queue is present. The techniques described below for measuring traffic parameters are of complexity O(n), even when a queue is present.

Figure 2:
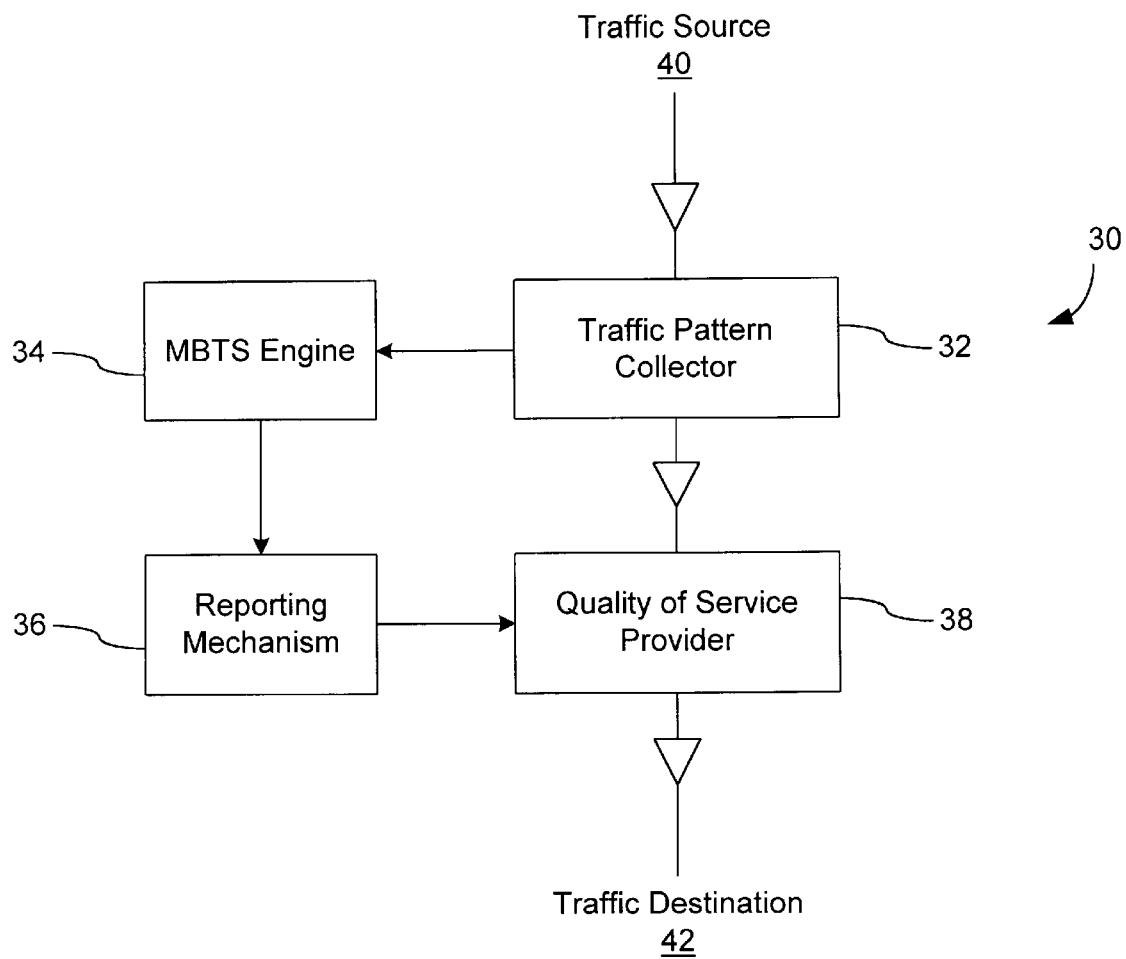
FIG. 2 is a block diagram depicting an example system for measuring network traffic at an observation point, the traffic describable by the token bucket model.

FIG. 2 shows a system 30 for measuring and characterizing data traffic in a network at an observation point. As will be discussed below, any point in a network may serve as a point at which data traffic is measured. Data flows from traffic source 40 to traffic destination 42. The data are received by traffic pattern collector 32 and are forwarded to quality of service provider 38. Quality of service provider 38 is one example of an entity that may be interested in traffic pattern measurements, but the techniques described below may be employed by other entities interested in traffic pattern measurements.

Traffic pattern collector 32 passes information about the data traffic to measurement-based traffic specification (MBTS) engine 34, such as the number of data packets received by traffic pattern collector 32, the number of bytes in each packet (called the "size" of the packet) and the respective times each packet arrived at traffic pattern collector 32. With this information, MBTS engine 34 computes b as a function of r. The results of the computation are passed along to quality of service provider 38 via reporting mechanism 36. Traffic pattern collector 32, MBTS engine 34, reporting mechanism 36 and quality of service provider 38 may be implemented as software operating in a single computer. As will be described below, quality of service provider 38 may use the computational results in many ways.

When traffic source 40 is a token bucket shaper as shown in FIG. 1, MBTS engine 34 can compute r and b associated with that token bucket shaper. Even if traffic source 40 is not a token bucket shaper, however, it is still advantageous to be able to measure both the rate and the burstiness of the traffic. In particular, it is advantageous to be able to measure b as a function of r as described by the token bucket model. It is especially advantageous to be able to find b as a function of r using techniques of complexity O(n). Complexity O(n) allows the computations to be performed efficiently and in real time. As will be described below, b may be found as a function of r using multiple stages of computation. In one embodiment, each stage approaches complexity O(n) such that the complexity of the entire process also approaches O(n).

As described above, traffic pattern collector 32 passes information about data traffic to MBTS engine 34, including the number of data packets received, the size of each packet and the times each packet arrived at traffic pattern collector 32. The packets of data that arrive may therefore be described as $(p_1, t_1), (p_2, t_2), \ldots, (p_k, t_k), \ldots, (p_n, t_n)$. The variable n represents the number of packets in the traffic pattern. The variable k represents any number from 1 to n, inclusive. The variables p and t represent size and time respectively, with the kth packet having a size $p_k$ bytes and arriving at a time $t_k$.

MBTS engine 34 begins with this data, and performs calculations to find b as a function of r. In general terms, MBTS engine 34 assumes a value of r, calculates possible values of b based upon the measured data and r, and then selects the largest value of b. For clarity, the calculations will be divided into three stages. In the first stage, intermediate function G(k) is computed, which is dependent upon the packet number k. The G(k) function is an intermediate function, rather than a final result. The variable q represents the number of bytes that can be stored in a queue associated with the token bucket and each value of k−G(k) is the number of data packets that can be backlogged on the queue. The value of q is a preset value independent of the data flow, and it is assumed that $q \geq 0$. If there were no queue (i.e., if q=0), G(k)=k for all k, meaning all packets have been passed and none is backlogged. The result of the computation yields n values of G(k). Some accessory variables, denoted $f_k$ (each value of f corresponding to a value of k, in units of bytes) and j, are useful in calculating G(k), as shown below. The computations begin by assigning $f_1=p_1$, G(1)=0. For higher values of k, the pseudocode below shows the first stage computations:

$$f_k = f_{k-1} + p_k;$$

$$j = G(k-1);$$

while ($f_k > q$)
{
  j ++;
  $f_k = f_k - p_j$;
};
G(k)=j;

In the above computation, the complexity is G(k)−G(k−1) plus a constant. Hence the total complexity to compute all G(k) values is the sum of G(k)−G(k−1) plus a constant, over all k, which is O(n). In other words, the complexity of finding G(k) for all k from 1 to n is linearly related to n.

In the second stage of the computation, the G(k) function is used to compute values of the function h(u, k). The h(u, k) function is dependent not only on packet number k, but also on a time interval, u. Each value of h(u, k) represents possible values for b. With a chosen value of r, the values of the h(u, k) function are calculated as shown in the pseudocode below:

$$h(G(k-1)+1, k) = \text{sum of } p_i \text{ over } i=(G(k-1)+1) \text{ to } G(k);$$

$$h(G(k-1)+1, k) = h(G(k-1)+1, k) - r(t_k - t_{G(k-1)+1});$$

$$h(u+1, k) = h(u, k) - p_u + r(t_{u+1} - t_u);$$

There are $n^2$ possible values for h(u, k). By following the second stage computation shown above, however, the number of defined h(u, k) values is equal to G(k)−G(k−1). The complexity of computing the values of h(u, k) is therefore O(n). The complexity of finding h(u, k) is consequently linearly related to the number of packets, n.

In the third computational stage, the G(k) function and h(u, k) function are used to compute values of b for each time $t_k$, or $b_k$. An accessory variable, $d_k$, is useful in finding $b_k$. The variable $d_k$ represents the maximum of all h(u, k) values which have corresponding subintervals ending at $t_k$. The computation begins by setting variables $b_1$ and $d_1$ equal to $p_1$. For higher values of k, values of $b_k$ are found as follows:

$$d_k = \max((d_{k-1} + \text{sum of } p_i - r(t_k - t_{k-1})), h(u, k)),$$

where the sum is taken over $$i=(G(k-1)+1) \text{ to } G(k),$$

and
where the max is taken over $$u=(G(k-1)+1) \text{ to } G(k);$$

$$b_k = \max(b_{k-1}, d_k);$$

The complexity of computing $b_k$ is O(n). The value of b for the chosen value of r is $b = \max(b_n, p_i)$ over all i from 1 to n. In other words, the value of b is either the value of $b_n$, or the largest data packet size, whichever is bigger.

In summary, the stages of computation together are of complexity O(n), meaning that the complexity is linearly related to the number of packets in the traffic pattern. Moreover, a computer-based computation uses memory space for $p_k$, $t_k$, $f_k$, $d_k$, $b_k$, h(u, k) and G(k), all of which are of a size O(n). Therefore the amount of computer memory needed to perform the computations is linearly related to the number of packets in the traffic pattern. The computations described above may be implemented as software, which may be stored in a machine or computer system on any machine-readable medium such as a magnetic disk or optical drive, or may be stored within non-volatile memory such as read-only memory (ROM).

Figure 3:
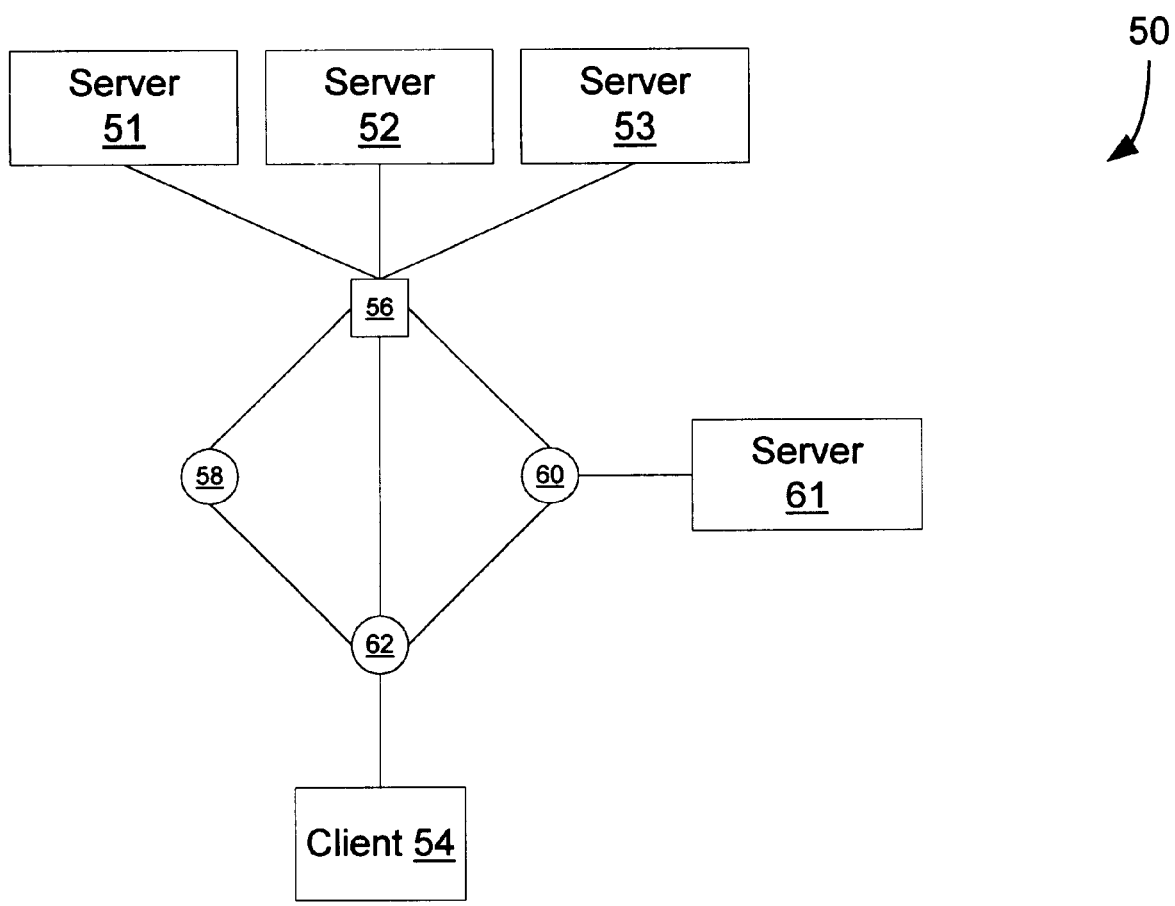
FIG. 3 is a high-level diagram of a network suitable for implementing the network traffic specification techniques.

FIG. 3 shows an exemplary network 50. Client 54 may make a request for data and servers 51, 52 and/or 53 may supply the requested data. An observation point for measuring data traffic, like observation point 30 shown in FIG. 2, may be sited at any point in network 50. For example, switch 56 may sense the data traffic associated with each server 51, 52 and 53, particularly the burstiness of the traffic, and may pass the request from client 54 to the server in the best position to supply the data to client 54. Switch 56 thus uses traffic data to balance the loads on servers 51, 52 and 53.

It is often agreed that one supplying data traffic to be delivered by network 50, such as server 61, may abide by a profile, that is, limitations upon rate and burstiness of the supplied traffic. An observation point placed between server 61 and router 60 can calculate how much of the traffic is within the bounds of the server's profile.

In addition, network 50 may offer traffic-based pricing, such as higher rates for more bursty traffic. Observation points in network 50 can be used to gather traffic data used for pricing.

A number of embodiments of the invention have been described. In some applications, especially those in which packet size is strictly restricted to a number of bytes, the complexity may be linearly related to the number of bytes, not just to the number of packets. These and other embodiments are within the scope of the following claims.

What is claimed is:

1. A method comprising:
  receiving traffic pattern data associated with a data transmission, the data transmission comprising at least two data packets and the traffic pattern data describable by a token bucket model with a queue; and
  calculating the token bucket capacity associated with the data transmission,
  wherein the complexity of the calculations is linearly related to the number of data packets.

2. The method of claim 1 further comprising calculating the token bucket capacity associated with the transmission as a function of a token generation rate.

3. The method of claim 1 further comprising reporting the results of the calculations.

4. The method of claim 1 wherein traffic pattern data associated with a data transmission comprises sizes of the data packets and times of arrival of the data packets.

5. An article comprising a computer-readable medium which stores computer-executable instructions for processing traffic pattern data associated with a data transmission, the instructions causing a machine to:
  receive traffic pattern data associated with a data transmission, the data transmission comprising at least two data packets and the traffic pattern data describable by a token bucket model with a queue; and
  calculate the token bucket capacity associated with the transmission,
  wherein the token bucket includes a queue and wherein the complexity of the calculations is linearly related to the number of data packets.

6. The article of claim 5, the instructions further causing the machine to calculate the token bucket capacity associated with the transmission as a function of a token generation rate.

7. The article of claim 5, the instructions further causing the machine to report the results of the calculations.

8. The method of claim 1 wherein traffic pattern data associated with a data transmission comprises sizes of the data packets and times of arrival of the data packets.

9. A system comprising:
  a measurement-based traffic specification engine configured to receive the traffic pattern data associated with a data transmission, the data transmission comprising at least two data packets and the traffic pattern data describable by a token bucket model with a queue, and further configured to calculate the token bucket capacity associated with the data transmission, the complexity of the calculations being linearly related to the number of data packets.

10. The system of claim 9 wherein traffic pattern data associated with a data transmission comprises sizes of the data packets and times of arrival of the data packets.

11. The system of claim 9 further comprising a traffic pattern collector configured to receive the data transmission and to transmit traffic pattern data associated with the data transmission to the measurement-based traffic specification engine.

12. A system comprising:
  a traffic pattern collector; and
  a measurement-based traffic specification engine,
  wherein the traffic pattern collector is configured to receive a data transmission, the data transmission comprising at least two data packets, and to transmit traffic pattern data associated with the data transmission to the measurement-based traffic specification engine, the traffic pattern data describable by a token bucket model with a queue and
  wherein the measurement-based traffic specification engine is configured to receive the traffic pattern data and to calculate the token bucket capacity associated with the data transmission, the complexity of the calculations being linearly related to the number of data packets.

13. The system of claim 12 wherein traffic pattern data associated with a data transmission comprises sizes of the data packets and times of arrival of the data packets.

14. A method comprising:
  receiving traffic pattern data associated with a network transmission of data packets, wherein the traffic pattern data includes sizes and times of arrival of network data packets and is describable by a token bucket model with a queue;
  calculating at least two values for the token bucket capacity describing the data transmission; and
  selecting the largest of the values for token bucket capacity.

15. The method of claim 14 further comprising calculating at least two values for the token bucket capacity as a function of a token generation rate.

16. The method of claim 14 wherein calculating at least two values for the token bucket capacity describing the data transmission comprises calculating less than all possible values for the token bucket capacity.

17. The method of claim 14 wherein the complexity of the calculations is linearly related to the number of data packets.

18. An article comprising a computer-readable medium which stores computer-executable instructions for processing traffic pattern data associated with a data transmission, the instructions causing a machine to:
  receive traffic pattern data associated with a network transmission of data packets, wherein the traffic pattern data includes sizes and times of arrival of network data packets and is describable by a token bucket model with a queue;
  calculate at least two values for the token bucket capacity describing the data transmission; and
  select the largest of the values for token bucket capacity.

19. The article of claim 18, the instructions further causing the machine to calculate at least two values for the token bucket capacity as a function of a token generation rate.

20. The article of claim 18 wherein calculating at least two values for the token bucket capacity describing the data transmission comprises calculating less than all possible values for the token bucket capacity.

21. The article of claim 18 wherein the complexity of the calculations is linearly related to the number of data packets.

* * * * *